(12) United States Patent
Aitharaju et al.

(10) Patent No.: US 12,506,198 B2
(45) Date of Patent: Dec. 23, 2025

(54) COMPOSITE MATERIALS SYSTEMS FOR BATTERY HOUSINGS AND COVERS HAVING IMPROVED THERMAL PERFORMANCE

(71) Applicant: GM GLOBAL TECHNOLOGY OPERATIONS LLC, Detroit, MI (US)

(72) Inventors: Venkateshwar R. Aitharaju, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 698 days.

(21) Appl. No.: 17/835,612

(22) Filed: Jun. 8, 2022

(65) Prior Publication Data
US 2023/0402685 A1 Dec. 14, 2023

(51) Int. Cl.
*H01M 50/126* (2021.01)
*H01M 50/367* (2021.01)
(Continued)

(52) U.S. Cl.
CPC ....... *H01M 50/126* (2021.01); *H01M 50/367* (2021.01); *H01M 50/375* (2021.01); *H01M 50/383* (2021.01); *H01M 2200/10* (2013.01)

(58) Field of Classification Search
None
See application file for complete search history.

(56) References Cited

U.S. PATENT DOCUMENTS 7,819,462 B1 10/2010 Owens
8,033,592 B2 10/2011 Hsu et al.
(Continued)

FOREIGN PATENT DOCUMENTS

| CN | 115799738 A | 3/2023 |
| CN | 117239324 A | 12/2023 |

(Continued)

OTHER PUBLICATIONS

Machine translation JP2021158025A (Year: 2025).*
(Continued)

*Primary Examiner* — Brian R Ohara
*Assistant Examiner* — M. T. Leonard
(74) *Attorney, Agent, or Firm* — Harness, Dickey & Pierce, P.L.C.

(57) ABSTRACT

The present disclosure provides a composite material housing for a battery pack for reducing or minimizing thermal runaway propagation. The composite material housing includes a polymeric structure defining an interior-facing surface and an exterior-facing surface. The polymeric structure includes a fire resistant material layer and a reinforcing material layer, where the fire resistant material layer defines an interior-facing surface, and the reinforcing material layer defines the exterior-facing surface. The composite material further includes a metallic layer disposed along the exterior-facing surface, where in a first operational mode the metallic layer contacts the exterior-facing surface and in a second operational mode, after exposure to a thermal load of greater than or equal to about 500° C., the metallic layer at least partially delaminates from the exterior-facing surface and forms one or more insulating air gaps that define a thermal barrier.

20 Claims, 4 Drawing Sheets

(51) Int. Cl.
*H01M 50/375* (2021.01)
*H01M 50/383* (2021.01)

(56) References Cited

U.S. PATENT DOCUMENTS

| | | | |
|---|---|---|---|
| 10,490,785 | B1 | 11/2019 | Simontacchi et al. |
| 10,665,913 | B2 | 5/2020 | Syed et al. |
| 10,749,146 | B2 | 8/2020 | Berger et al. |
| 2006/0106147 | A1 | 5/2006 | Fasulo et al. |
| 2006/0199890 | A1 | 9/2006 | Fasulo et al. |
| 2006/0204819 | A1 | 9/2006 | Murakami et al. |
| 2007/0299185 | A1 | 12/2007 | Ottaviani et al. |
| 2010/0098925 | A1 | 4/2010 | Fasulo et al. |
| 2011/0121225 | A1 | 5/2011 | Posudievsky et al. |
| 2013/0216887 | A1 | 8/2013 | Wayne et al. |
| 2016/0126535 | A1 | 5/2016 | Qiao et al. |
| 2016/0181590 | A1 | 6/2016 | Fan et al. |
| 2017/0002273 | A1 | 1/2017 | Rubin-Pitel et al. |
| 2017/0022703 | A1 | 1/2017 | Buttner et al. |
| 2017/0362401 | A1 | 12/2017 | Seidel et al. |
| 2019/0135995 | A1 | 5/2019 | Mizuta et al. |
| 2019/0348725 | A1 | 11/2019 | Golubkov |
| 2020/0002552 | A1 | 1/2020 | Song et al. |
| 2020/0119317 | A1* | 4/2020 | Nakabayashi ...... H01M 50/172 |
| 2020/0152926 | A1* | 5/2020 | Wynn ................. H01M 50/155 |
| 2023/0142691 | A1 | 5/2023 | Aitharaju et al. |
| 2023/0191751 | A1 | 6/2023 | Bem et al. |

FOREIGN PATENT DOCUMENTS

| | | |
|---|---|---|
| DE | 102022119828 A1 | 3/2023 |
| DE | 102022127642 A1 | 12/2023 |
| JP | 2021158025 A * | 10/2021 |

OTHER PUBLICATIONS

ASM Handbook, Table 10, vol. 10—Materials Characterization (2019 edition) Â© 2019 ASM International (Year: 2019).*

Engineering Materials 1—An Introduction to Properties, Applications and Design (5th Edition), Table 31.1, Â© 2019 Elsevier (Year: 2019).*

* cited by examiner

COMPOSITE MATERIALS SYSTEMS FOR BATTERY HOUSINGS AND COVERS HAVING IMPROVED THERMAL PERFORMANCE

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Lithium-ion electrochemical or batteries typically include a plurality of cells that are electrically connected in a stack (parallel or series) to increase overall output. The individual cells may include alternating positive and negative electrodes and separators, or electrolyte layers, disposed therebetween. One or more of the plurality of cells may define battery modules that are assembled to form a battery pack that is disposed in an encasement or battery housing or cover. To reduce weight and enhance gravimetric efficiency, battery housings or covers are often formed of reinforced composite materials as opposed to metals. However, during thermal runaway propagation (TRP) events, it can be advantageous if the housing or cover has a thermal barrier or self-extinguishing behavior so as to avoid burning of the reinforced composite material.

SUMMARY

This section provides a general summary of the disclosure, and is not a comprehensive disclosure of its full scope or all of its features.

The present disclosure relates to housings or covers for electrochemical cells/batteries, and also, methods of making and using the same, where the housing or covers are configured to provided thermal barriers that reduce or minimize thermal runaway and propagation events.

In various aspects, the present disclosure provides a composite material housing for a battery pack for reducing or minimizing thermal runaway propagation. The composite material housing may include a polymeric structure defining an interior-facing surface and an exterior-facing surface. The polymeric structure may include a fire resistant material layer and a reinforcing material layer, where the fire resistant material layer defines an interior-facing surface, and the reinforcing material layer defines the exterior-facing surface. The composite material may further include a metallic layer disposed along the exterior-facing surface, where in a first operational mode the metallic layer contacts the exterior-facing surface and in a second operational mode, after exposure to a thermal load of greater than or equal to about 500° C., the metallic layer at least partially delaminates from the exterior-facing surface and forms one or more insulating air gaps that define a thermal barrier.

In one aspect, the fire resistant material layer may include aromatic polyamide fibers.

In one aspect, the fire resistant material layer may further include a resin matrix. The aromatic polyamide fibers may be continuously or randomly distributed within the resin matrix.

In one aspect, the resin matrix may be selected from the group consisting of: epoxy, phenolic resin, polyester, vinyl ester, and combinations thereof.

In one aspect, the fire resistant material layer may include greater than or equal to about 30 vol. % to less than or equal to about 60 vol. % of the aromatic polyamide fibers, and greater than or equal to about 40 vol. % to less than or equal to about 70 vol. % of the resin.

In one aspect, the reinforcing material layer may include reinforcing fibers selected from the group consisting of: carbon fibers, glass fibers, basalt fibers, natural plant fibers, and combinations thereof.

In one aspect, the reinforcing material layer may further include a resin matrix. The reinforcing fibers may be continuously or randomly distributed within the resin matrix.

In one aspect, the resin matrix may be selected from the group consisting of: epoxy, phenolic resin, polyester, vinyl ester, and combinations thereof.

In one aspect, the reinforcing material layer may include greater than or equal to about 30 vol. % to less than or equal to about 60 vol. % of the reinforcing fibers, and greater than or equal to about 40 vol. % to less than or equal to about 70 vol. % of the resin matrix.

In one aspect, the metallic layer may include a material selected from the group consisting of: steel, stainless steel, aluminum, alloys, and combinations thereof.

In one aspect, the composite material housing may further include an adhesive layer that attaches the metallic layer and the reinforcing material layer. The adhesive may have a ductility value of greater than or equal to about 2% to less than or equal to about 20% at a temperature above about 200° C.

In one aspect, the fire-resistant material layer may have an average thickness greater than or equal to about 1 mm to less than or equal to about 4 mm. The reinforcing material layer may have an average thickness greater than or equal to about 1 mm to less than or equal to about 3 mm. The metallic layer may have an average thickness greater than or equal to about 0.01 mm to less than or equal to about 0.5 mm.

In various aspects, the present disclosure provides a composite material housing for a battery pack for reducing or minimizing thermal runaway propagation. The composite material housing may include a fire-resistant material layer, a reinforcing material layer disposed near to a surface of the fire-resistant material layer, and a metallic layer disposed near to a first surface of the reinforcing material layer disposed away from the fire-resistant material layer. In a first operational mode, the metallic layer may contact the first surface, and in a second operational mode, after exposure to a thermal load of greater than or equal to about 500° C., the metallic layer may at least partially delaminate from the first surface and forms one or more insulating air gaps that define a thermal barrier. The fire-resistant material layer may include aromatic polyamide fibers continuously or randomly distributed within a first resin matrix. The reinforcing material layer may include reinforcing fibers continuously or randomly distributed within a second resin matrix.

In one aspect, the first and second resin matrices may be independently selected from the group consisting of: epoxy, phenolic resin, polyester, vinyl ester, and combinations thereof.

In one aspect, the metallic layer may include a material selected from the group consisting of: steel, stainless steel, aluminum, alloys, and combinations thereof.

In one aspect, the fire resistant material layer may include greater than or equal to about 30 vol. % to less than or equal to about 60 vol. % of the aromatic polyamide fibers, and greater than or equal to about 40 vol. % to less than or equal to about 70 vol. % of the first resin matrix. The reinforcing material layer may include greater than or equal to about 30 vol. % to less than or equal to about 60 vol. % of the reinforcing fibers, and greater than or equal to about 40 vol. % to less than or equal to about 70 vol. % of the second resin matrix.

In one aspect, the composite material housing may further include an adhesive layer binding the metallic layer and the reinforcing material layer. The adhesive layer may have a ductility value of greater than or equal to about 2% to less than or equal to about 20% at a temperature above about 200° C.

In one aspect, the fire-resistant material layer may have an average thickness greater than or equal to about 1 mm to less than or equal to about 4 mm. The reinforcing material layer may have an average thickness greater than or equal to about 1 mm to less than or equal to about 3 mm. The metallic layer may have an average thickness greater than or equal to about 0.01 mm to less than or equal to about 0.5 mm.

In various aspects, the present disclosure may provide a method of forming a composite material housing for a battery for reducing or minimizing thermal runaway propagation. The method may include disposing a metallic layer into a cavity of a mold; disposing a reinforcing material into the cavity near to the metallic layer; disposing a fire-resistant material into the cavity near to the reinforcing material; disposing a resin or a precursor of the resin into the cavity, the resin or the precursor of the resin surrounding the reinforcing material and the fire-resistant material; solidifying the resin or the precursor of the resin to form a composite material that includes a metallic layer, a reinforcing material layer near to the metallic layer, and a fire-resistant material layer near to the reinforcing material layer; and removing the composite material from the cavity to form the composite material housing.

In one aspect, the method further may further include at least one of: heating the mold and applying a pressure to the mold for compression.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
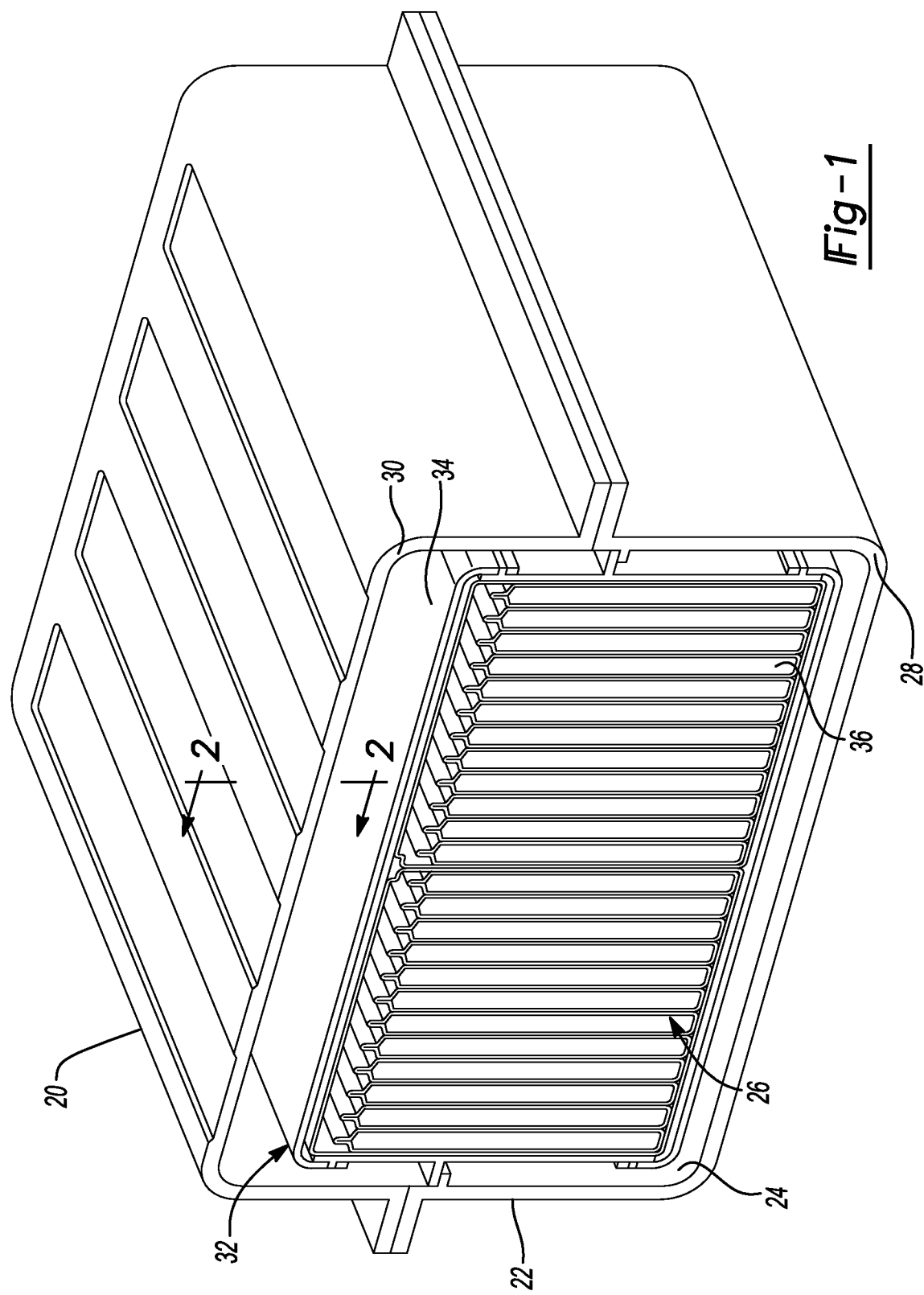
FIG. 1 is a perspective view of an example composite battery cover or housing defining a cavity or opening including a battery with various components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides a housing or encasement for a battery for reducing or minimizing thermal runaway propagation. A housing is generally understood to be a physical structure that is rigid and houses a plurality of electrochemical cells that form a plurality of modules in a battery pack. The housing protects the battery pack and any other internal components from an external environment, including external forces. The housing may also be referred to as a cover or an encasement. Notably, the concepts described herein may be used to form other protective structures that encase other subcomponents within a battery.

By way of background, FIG. 1 illustrates a non-limiting example of a battery housing or cover 20 for a lithium ion battery. The housing 20 has a first or exterior-facing surface 22 and a second or interior-facing surface 24 that faces an interior compartment 26. The housing 20 may be an assembly of distinct components or parts including, for example, a lower tray cover 28 and an upper battery pack cover that are joined together to define a protective structure that encases interior components. The present technology contemplates at least the upper battery back cover 30 being formed of a hybrid material, such as described further below.

As illustrated, a battery pack 32 may be disposed in the interior compartment 26. The battery pack 32 may include one or more battery modules 34. Although only a single module 34 is illustrated, it should be appreciated that the battery pack may include a plurality of battery modules 34. In each variation, the battery modules 34 include a plurality of battery cells 36 (provided, for example, in subassemblies of stacks or blocks) that may be disposed in a frame or other structure in each battery module 34 for protection from external forces or heat. As would be appreciated by the skilled artisan, any number of the cells, blocks, and/or battery modules may be selected and connected to a positive source terminal or a negative source terminal. Similarly, the cells, blocks, and battery modules may be connected: in series and/or in parallel; in different connected configurations; and may be organized into blocks, packs, and/or groups. In certain variations, the battery cells 36 and module (s) 34 may be connected and controlled via a battery management system (BMS—not shown in FIG. 1) that can help to control and manage various aspects of the battery operation, including power output, voltage, current, temperature, SOX, and the like. Thus, the battery housing 20 may encase in an interior compartment 26 the battery pack 32, including the one or more battery modules 34 and the BMS, and also, in certain instances optionally a cooling system (not shown), along with any other electrical conduits or conventional components, such as bus bars, circuitry, and portions of terminals for external connection to a load and power source.

In various aspects, the present disclosure comprises a housing for a battery for reducing or minimizing thermal runaway propagation (TRP), which may be an uncontrolled high temperature thermal event, including a conflagration or fire. As referred to herein, such a thermal runaway propagation event may be caused by a thermal load that is excessive and beyond the range of normal operational temperatures. By way of example, a thermal runaway propagation may result if a short circuit arises within the battery. For example, a source of heat or flame in a thermal runaway propagation event may exceed temperatures of about 500° C., optionally about 600° C., optionally about 700° C., optionally about 800° C., optionally about 900° C. optionally about 1,000° C., optionally about 1,100° C., and optionally may exceed about 1,200° C. The source of heat or flame may originate in the interior compartment of the battery housing or module.

Figure 2A:
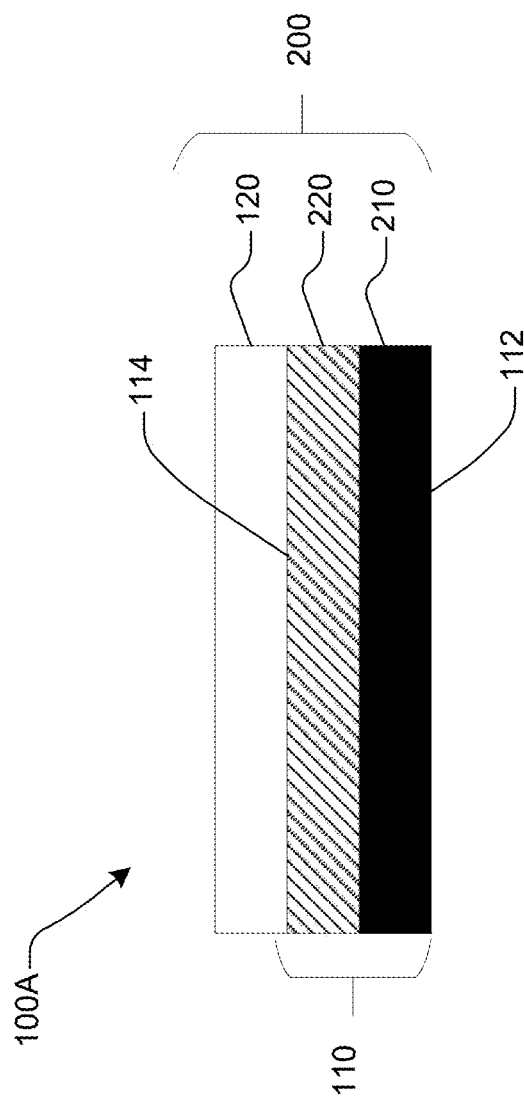
FIG. 2A is a cross-sectional view of a composite assembly for forming a battery cover or housing, like the cover or housing illustrated in FIG. 1, in a first operational mode, where the composite assembly includes a polymeric structure and a metallic layer coated thereon in accordance with various aspects of the present disclosure.

In various aspects, as illustrated in FIG. 2A, a housing for forming a battery cover or housing, like the cover or housing illustrated in FIG. 1, may be prepared from a composite or hybrid structure or assembly 200 including, for example, of a fire-resistant material layer 210, a reinforcing material layer 220 disposed on a first or exterior-facing surface of the fire-resistant material layer 210, and a metallic layer or surface 120 disposed on an exposed surface of the reinforcing material layer 220. For example, the composite assembly 200 may include greater than or equal to about 10 vol. % to less than or equal to about 100 vol. % of the fire-resistant layer 210 and greater than or equal to about 10 vol. % to less than or equal to about 90 vol. % of the of the reinforcing material layer 220. The combined volume of the fire-resistant layer 210 together with the reinforcing material layer 220 may be greater than or equal to about to less than or equal to about 400 times the volume of the metallic layer 120.

The fire-resistant material layer 210 forms an interior-facing surface of the housing 200 (i.e., surface that faces the battery and other components) and includes intrinsically fire-retardant materials, like aromatic polyamide fibers, such as aramid or para-aramid fiber commercially available from DuPont as KEVLAR™ fibers. The aromatic polyamide fibers may be continuously or randomly distributed individual fibers within a (first) resin matrix or provided as fiber mats or fabric having interconnecting or contacting fibers. In each variation, the aromatic polyamide fibers may include chopped fibers, continuous fibers, or a combination thereof. For example, in certain aspects, the aromatic polyamide fibers may be relatively short length fibers (having lengths of greater than or equal to about 0.1 millimeters (mm) to less than or equal to about 10 mm), relatively long length fibers (having lengths of greater than or equal to about 10 mm to less than or equal to about 100 mm), or continuous fibers (having lengths of greater than or equal to about 100 mm), and may include any combinations thereof. The inclusion of long length aromatic polyamide fibers may help balance of moldability/productivity/mechanical performance. The aromatic polyamide fibers may be disposed in a randomly-oriented manner, for example, in a substantially two-dimensionally-randomly oriented or in a specific-direction-oriented manner (e.g., anisotropic). In certain variations, a fiber mat may be used with highly planar oriented or uni-directional oriented aromatic polyamide fibers or a combination thereof. In still other variations, a random fiber mat including aromatic polyamide fibers can be used.

The (first) resin matrix may be formed from any suitable precursor or resin. For example, thermoset resins are cured from a liquid precursor to form a polymer, and for thermoplastic polymer matrix materials, the polymers melt to a liquid state or dissolved in a solvent to form a solution before the aromatic polyamide fibers are added to create the fire-resistant material layer 210. By way of non-limiting example, in certain variations, the resin matrix of the fire-resistant material layer 210 may be prepared using precursors selected from the group consisting of: epoxy (where hydroxyl groups, such as bisphenol A and bisphenol B, are reacted with epichlorhydrin), phenolic resins (phenolic resins may be formed by a reaction of phenol or substituted phenol with formaldehyde), polyester, vinyl ester, and combinations thereof. The fire-resistant material layer 210 may include greater than or equal to about 10 vol. % to less than or equal to about 60 vol. %, and in certain aspects, optionally include greater than or equal to about 30 vol. % to less than or equal to about 60 vol. %, of the aromatic polyamide fibers, where the fire-resistant material layer 210 includes greater than or equal to about 40 vol. % to less than or equal to about 70 vol. % of the (first) resin matrix. In certain variations, the aromatic polyamide fibers may be homogeneously distributed within the (first) resin matrix.

In certain variations, the fire-resistant material layer 210 may further include various other materials including, for example, other reinforcement materials and/or functional fillers or additive agents (like organic/inorganic fillers, fire-retardants, anti-ultraviolet radiation agents (UV stabilizers), anti-oxidants, colorants, or pigments (such as carbon black powder), mold release agents, softeners, plasticizing agents, surface active agents, and the like). In each variation, the fire-resistant material layer 210 may have an average thickness greater than or equal to about 1 mm to less than or equal to about 4 mm, and in certain aspects, optionally thickness greater than or equal to about 1 mm to less than or equal to about 3 mm.

The reinforcing material layer 220 may cover greater than or equal to about 85%, optionally greater than or equal to about 90%, optionally greater than or equal to about 95%, optionally greater than or equal to about 98%, optionally greater than or equal to about 99%, optionally greater than or equal to about 99.5%, and in certain aspects, optionally greater than or equal to about 99.8%, of a total surface area of the first or exterior-facing surface of the fire-resistant material layer 210. The reinforcing material layer 220 may be a fibrous layer. The reinforcing material layer may include, for example, carbon fibers, glass fibers (such as fiber glass or quartz), basalt fibers, natural plant fibers, and combinations thereof. The reinforcing fibers may be continuously or randomly distributed individual fibers within a (second) resin matrix or provided as fiber mats or fabric having interconnecting or contacting fibers. In each variation, the reinforcing fibers may include chopped fibers, continuous fibers, or a combination thereof. For example, in certain aspects, the reinforcing fibers may be relatively short length fibers (having lengths of greater than or equal to about 0.1 mm to less than or equal to about 10 mm), relatively long length fibers (having lengths of greater than or equal to about 10 mm to less than or equal to about 100 mm), or continuous fibers (having lengths of greater than or equal to about 100 mm), and may include any combinations thereof. The inclusion of long length reinforcement fibers may help balance of moldability/productivity/mechanical performance. The reinforcement fibers may be disposed in a randomly-oriented manner, for example, in a substantially two-dimensionally-randomly oriented or in a specific-direction-oriented manner (e.g., anisotropic). In certain variations, a fiber mat may be used with highly planar oriented or uni-directional oriented reinforcing fibers or a combination thereof. In still other variations, a random fiber mat including the reinforcing fibers can be used.

Like the (first) resin matrix of the fire-resistant material layer 210, the (second) resin matrix may be formed from any suitable precursor or resin. For example, thermoset resins are cured from a liquid precursor to form a polymer, and for thermoplastic polymer matrix materials, the polymers melt to a liquid state or dissolved in a solvent to form a solution before the reinforcement fibers are added to create the reinforcing layer 220. By way of non-limiting example, in certain variations, the resin matrix of the reinforcing layer 220 may be prepared using precursors selected from the group consisting of: epoxy (where hydroxyl groups, such as bisphenol A and bisphenol B, are reacted with epichlorhydrin), phenolic resins (phenolic resins may be formed by a reaction of phenol or substituted phenol with formaldehyde), polyester, vinyl ester, and combinations thereof. The reinforcing layer 220 may include greater than or equal to about 10 vol. % to less than or equal to about 60 vol. %, and in certain aspects, optionally include greater than or equal to about 30 vol. % to less than or equal to about 60 vol. %, of the reinforcing fibers, where the reinforcing layer 220 includes greater than or equal to about 30 vol. % to less than or equal to about 55 vol. % of the (second) resin matrix. In certain variations, the reinforcing fibers may be homogeneously distributed within the (second) resin matrix.

In certain variations, the reinforcement layer 220 may further include various other materials including, for example, other reinforcement materials and/or functional fillers or additive agents (like organic/inorganic fillers, fire-retardants, anti-ultraviolet radiation agents (UV stabilizers), anti-oxidants, colorants, or pigments (such as carbon black powder), mold release agents, softeners, plasticizing agents, surface active agents, and the like). In each variation, the reinforcement layer 220 may have an average thickness greater than or equal to about 1 mm to less than or equal to about 4 mm, and in certain aspects, optionally thickness greater than or equal to about 1 mm to less than or equal to about 3 mm.

As further detailed below, the metallic layer 120 may be bonded to, or integrally molded with, a second or exterior-facing surface 114 of the reinforcing material layer 220. The metallic layer 120 may cover greater than or equal to about 85%, optionally greater than or equal to about 90%, optionally greater than or equal to about 95%, optionally greater than or equal to about 98%, optionally greater than or equal to about 99%, optionally greater than or equal to about 99.5%, and in certain aspects, optionally greater than or equal to about 99.8%, of a total surface area of a second or exterior-facing surface of the reinforcing material layer 220. In certain variations, the metallic layer 120 may be a foil or thin layer having an average thickness greater than or equal to about 0.01 mm to less than or equal to about 0.5 mm, and in certain aspects, optionally greater than or equal to about 0.01 mm to less than or equal to about 0.2 mm. The metallic layer 120 may include, for examples, aluminum, steel, stainless steel, and any alloys or combined layers thereof.

Although not illustrated, it should be recognized that in certain variations, an adhesive may be used to bond the metallic layer 120 to the exterior facing surface of the reinforcing material layer 220. The adhesive may have low ductility at high temperatures, for example, with a ductility value of greater than or equal to about 2% to less than or equal to about 20% at a temperature above or equal to about 200° C. For example, in certain variations, the adhesive may contain one or more intumescent materials, such as expanded graphite, which may increase in volume when exposed to an excessive thermal load. In this way, the adhesive promotes a desirable amount of delamination during a thermal event, as further discussed below. In certain aspects, the adhesive may be an epoxy adhesive or a polyurethane adhesive. Such low ductility adhesives are selected so that they can easily fail at elevated temperatures in a thermal runaway propagation event.

The fire-resistant material layer 210 and reinforcing material layer 220 may together define a polymeric structure 110 that has a first coefficient of thermal expansion, while the metallic layer 120 may have a second coefficient of thermal expansion that is different form the first coefficient of thermal expansion. In this manner, the composite assembly 200, including, for example, the adhesive, allows for the creation of strategic separation and/or delamination between the distinct materials (e.g., between the polymeric structure 110 and the metallic layer 120) during a battery thermal runaway propagation event and thus creates a fire-retardant thermal barrier at the interface, effectively lowering the temperature on the back surface of the metallic plate or layer 120, as will be further detailed below.

In certain variations, the first coefficient of thermal expansion (CTE)/first coefficient of linear thermal expansion (CLTE) of the polymeric structure 110 may be greater than $0\ K^{-1}$ to less than or equal to $10\times10^{-6}\ K^{-1}$ in a direction of the fibers (when the fibers are aligned) and about $30\times10^{-6}\ K^{-1}$ to $50\times10^{-6}\ K^{-1}$ in a transverse direction. As would be appreciated by the skilled artisan, the coefficient of thermal expansion in a composite is generally dependent upon direction, where directions parallel to the fiber orientation are lower and those orthogonal or perpendicular to the fiber orientation are higher. Generally, metallic materials are substantially isotropic in terms of the coefficient of linear thermal expansion. In accordance with the present teachings, a difference of coefficient of linear thermal expansion between the respective components of polymeric structure 110 and metallic layer 120 is maximized, so that a thermal coefficient of linear expansion of metal and the polymeric structure 110 measured in the two orthogonal directions creates a strategic delamination. For example, a second coefficient of linear thermal expansion of metal may be juxtaposed in relation to and compared with a highest coefficient of linear thermal expansion of the composite assembly to have a maximal difference in coefficient of linear thermal expansion. The difference in coefficient of linear thermal expansion ($\Delta\alpha$) may be calculated in a particular direction by the following equation=$\Delta\alpha=(\alpha_{mi}-\alpha_{ci})$, where $\alpha$ is a coefficient of linear thermal expansion in a predetermined direction, i is 1, 2; m is the metal, and c is the composite. The second linear coefficient of linear thermal expansion for aluminum is $21\times10^{-6}\ K^{-1}$ to $24\times10^{-6}\ K^{-1}$. The second linear coefficient of linear thermal expansion for steel is $11\times10^{-6}\ K^{-1}$ to $13\times10^{-6}\ K^{-1}$. In this manner, in various aspects of the present technology, a largest difference between the respective components of thermal coefficient of expansion of metal and the polymeric structure measured in the two orthogonal directions helps to create a strategic delamination.

Figure 2B:
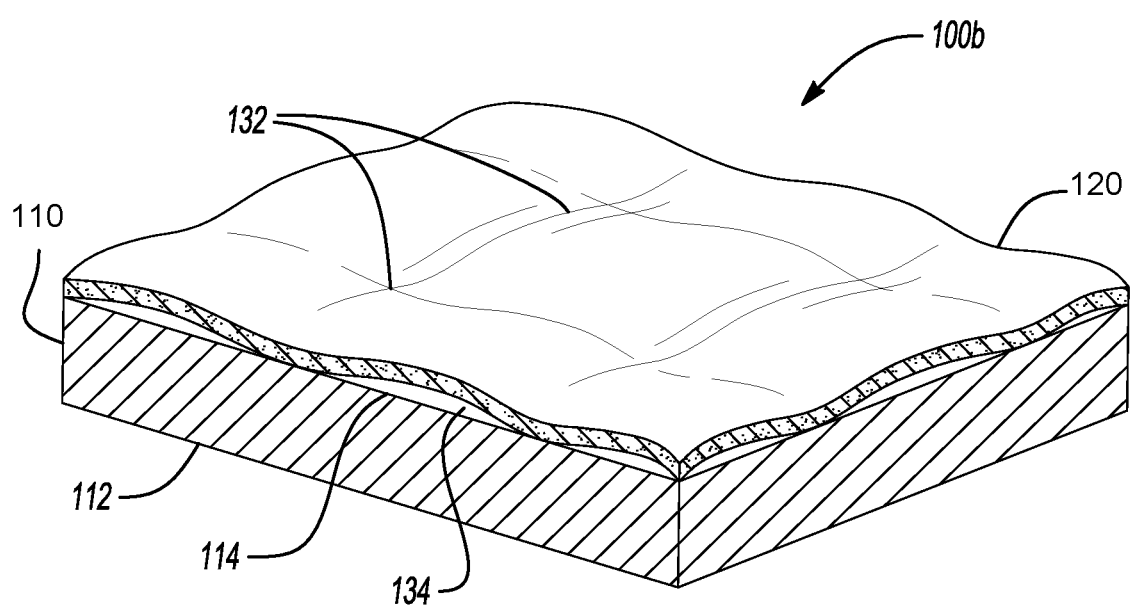
FIG. 2B is a cross-sectional view of the composite assembly for forming the battery cover or housing, like the cover or housing illustrated in FIG. 1, in a second operational mode where the metallic layer is delaminated in selected regions from a polymeric structure.
Figure 3:
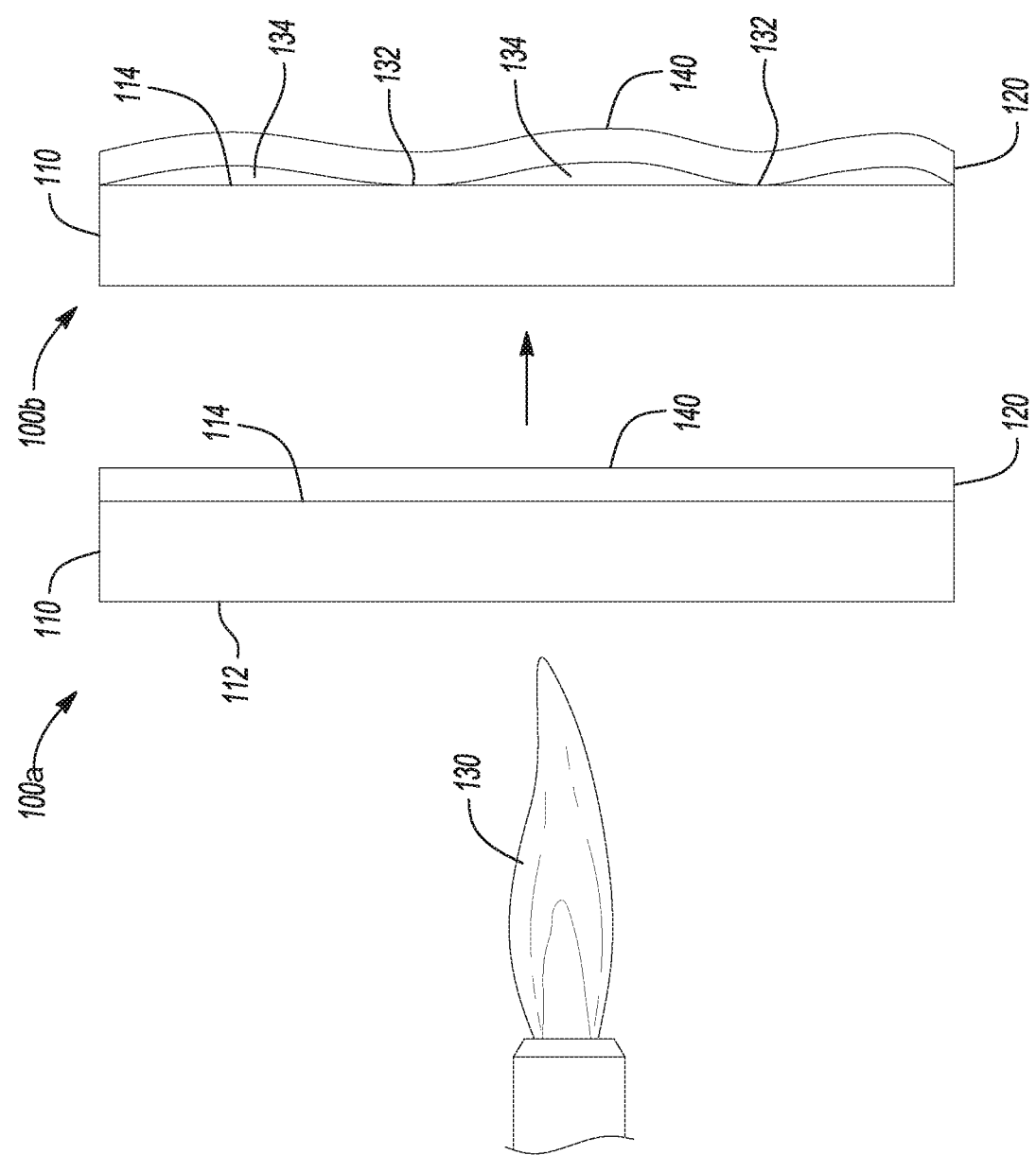
FIG. 3 includes cross-sectional views of the composite assembly for forming the battery cover or housing, like the cover or housing illustrated in FIG. 1, where the composite assembly transitions from the first operational mode, as illustrated in FIG. 2A, to the second operational mode, as illustrated in FIG. 2B.

FIG. 2A shows the composite assembly 200 in a first operational mode 100A, where the metallic layer 120 is in substantially full contact with the polymeric structure 110, while FIG. 2B shows the composite assembly 200 in a second operational mode 100B where the metallic layer 120 is delaminated in selected regions from a polymeric structure 110. As illustrated in FIG. 3, the second operational mode occurs after exposure of the composite assembly 200 to a thermal load 130. For example, an interior-facing or first surface 112 of the composite assembly 200 defined, for example, by the fire-resistant material layer 210 may be exposed to the thermal load 130. The torch may be a flame, or in certain variations, as illustrated in FIG. 3, a torch that is configured to generate a test flame as part of a torch test. Notably, the setup shown in FIG. 3, simulates the thermal load 130 being generated from within the battery housing as would potentially occur during battery operation and use, so that the thermal load/flame 130 first contacts the interior facing first surface 112 of the composite assembly 200. In each variation, the thermal load 130 may have a temperature of greater than or equal to about 500° C., optionally greater than or equal to about 600° C., optionally greater than or equal to about 700° C., optionally greater than or equal to about 800° C., optionally greater than or equal to about 900° C., optionally greater than or equal to about 1,000° C., optionally greater than or equal to about 1,100° C., and in certain aspects, optionally may exceed greater than or equal to about 1,200° C.

As discussed above, after exposure to the after exposure to the thermal load 130, the composite assembly 200 is in a second operational mode 100B, where the metallic layer 120 at least partially delaminates from the exterior facing second surface 114 of the composite assembly 110. In this manner, as the metal layer 120 separates in a select regions from the exterior facing second surface 114, for example, remaining attached to the exterior facing second surface 114 in certain anchored first regions 132, while being separated and delaminated in other regions that creates a plurality of insulating air gaps 134 defined between the exterior facing second surface 114 of the polymeric structure 110 and the metal layer 120 that define a thermal barrier. As described above, in this variation, a strategic mismatch of the coefficients of thermal expansion (CTE) between the polymeric structure 110 and metallic layer or plate 120 maximizes separation between the two distinct materials helping to cause the delamination and to create the gap 134 during a battery thermal event that protects the polymeric structure 110 and minimizes or prevents it from being burned through (e.g., the thermal load burning the composite to the extent that a through hole, rupture, or opening is formed).

The plurality of insulating air gaps 134 may minimize flame propagation and serve to assist in protecting the polymeric structure 110 from burning through or reaching temperatures that result in forming breaches or openings in the composite assembly 200. Further, this fire-retardant thermal barrier at the interface between the composite assembly 200 and the metal layer 120 effectively lowers the temperature on a back surface 140 of the metallic layer 120 and thus draws heat away from the polymeric structure 110. The delaminated metal layer 120 thus enhances thermal performance. The thermal barrier formed by the insulating air gaps 134 defined between the polymeric structure 110 and the metallic layer 120 can provide endurance at higher temperatures than previous technologies, for example, being able to withstand up to 1,200° C. torch or flame, in certain variations.

In certain previous technologies, a metal layer facing the interior of a battery cover or housing would often be sacrificial and would potentially melt when exposed to a thermal load associated with a thermal runaway propagation event without forming a thermal barrier with insulating air gaps. Further still, other previous technologies relied on three or more layers, for example, a polymeric substrate, one or more separate blanket layers, and metallic foil (facing the interior compartment). Such metallic foil and/or blanket layers served as a sacrificial layer to protect the polymeric structure/substrate for a fire extinguishing effect alone. In the present technology, the composite assembly itself may be modified without the presence of a separate blanket layer or other thermal barrier layer to provide the heat performance desired. Thus, the battery cover or housing formed using a composite assembly in accordance with various aspects of the present disclosure, may be free of any sacrificial layers (aside from the adhesive that may melt), including, for example, interiorly disposed thermal barriers. In certain aspects, the battery cover or housing as prepared in accordance with various aspects of the present disclosure may consist essentially of the polymeric structure and the metallic layer (with or without at least one surface layer including a thermal barrier material distributed therein and an optional adhesive layer disposed therebetween) described above. As noted above, the metallic layer remains present during and after the thermal runaway propagation event.

Moreover, in certain previous technologies, outgassing relied on cells expelling hot gasses that would make the metallic layer contact the blanket layer during the thermal runaway propagation event, which made it unpredictable or uncertain whether any air gaps would form. In the present embodiments, the metallic layer is disposed on the outside or exterior of the housing, so expelled gases (e.g., from the adhesive or composite assembly outgassing) will help to create the air gap between the metallic layer and the composite and thus reliably create a thermal barrier. Notably, the present technology maintains a temperature of the exterior surface of the housing or cover opposite to the flame or torch during the thermal runaway propagation event, so that the metallic layer opposite to the flame/torch is at a lower temperature than a critical value and the surface of the housing or cover facing the flame/torch is not breached with any holes or openings during the thermal runaway propagation event.

In various aspects, the present disclosure provides a method for preparing a composite assembly, like the composite assembly illustrated in FIG. 2A, to be used to form a housing. The composite assembly may be prepared using an integral process or as individual components to be joined or coupled together following a formation process. For example, in certain variations, the polymeric structure may be co-molded with the metallic foil using, for example, a resin transfer molding process or a compression molding process. In other variations, the polymeric structure may be first molded using, for example, a resin transfer molding process or a compression molding process and the polymeric structure may then be bonded with a metallic foil using, for example, an adhesive having a low ductility, as detailed above.

In various aspects, the present disclosure provides a method for preparing a battery cover or housing, like the housing illustrated in FIG. 1, that experiences reduced or minimized thermal runaway propagation. The method may include preparing a mold having a cavity and disposing a metallic layer into the cavity. In certain variations, method may include pre-heating the mold. The method may further include disposing a reinforcing material and a (first) resin into the cavity adjacent or near to an exposed surface of the metallic layer, and disposing fire-resistant material and a (second) resin into the cavity adjacent or near to an exposed surface of the reinforcing material including the (second) resin. It should be appreciated that, in certain variations, a fire-resistant material and a (first) resin may be disposed first into the cavity and that a reinforcing material and a (second) resin may be disposed adjacent or near to an exposed surface of the fire-resistant material including the (first) resin, and a metallic layer may be disposed adjacent or near to an exposed surface of the reinforcing material including the (second) resin. It should also be appreciated that, in certain variations the fire-resistant material may be disposed first into the cavity and that the reinforcing material may be disposed adjacent or near to an exposed surface of the first-resistant material and the method then includes disposing a resin in the cavity that surrounds the fire-resistant material and the reinforcing material. In each instance, the first and second resins may be the same or different, and the method further includes solidifying (e.g., curing, crosslinking, or cooling a melted thermoplastic) the resin to form a reinforcing material layer (like the reinforcing material layer 220 illustrated in FIG. 2A) and a fire-resistant material layer (like the fire-resistant material layer 210 illustrated in FIG. 2A). In certain variations, the method may include one or more heating steps and/or the application of pressure for compression. In each instance, the method may include opening and/or removing the as-prepared battery cover or housing from the mold.

In other variations, a method for preparing a battery cover or housing, like the housing illustrated in FIG. 1, that experiences reduced or minimized thermal runaway propagation may be an integral molding process including, for example, a compression molding process or a resin transfer molding process. In the instance of resin transfer molding, a fire resistant material may be placed into a mold, a reinforcing material may be placed into the mold adjacent or near to an exposed surface of the first resistant material, and a metallic layer may be placed into the mold adjacent or near to an exposed surface of the reinforcing material. The method may include introducing, for example, infusing, a resin into the mold under pressure (e.g., greater than or equal to about 10 psi to less than or equal to about 4,000 psi). The resin may be introduced using injection molding techniques. In each instance, the resin may be solidified to form the first resistant material layer and the reinforcing material layer, and the method may further include opening and removing the as-prepared housing from the mold. In certain variations, the method may include heating the mold, for example, the mold may be heated prior to the introduction of the first resistant material and/or the reinforcing material, prior to or with the introduction of the resin, and/or after the infusion of the resin.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A composite material housing for a battery pack for reducing or minimizing thermal runaway propagation, the composite material housing comprising:
   a polymeric structure defining an interior-facing surface and an exterior-facing surface, wherein the polymeric structure has a first coefficient of thermal expansion and the polymeric structure comprises a fire-resistant material layer and a reinforcing material layer, the fire-resistant material layer defining the interior-facing surface and the reinforcing material layer defining the exterior-facing surface; and
   a metallic layer disposed along the exterior-facing surface, wherein the metallic layer has a second coefficient of thermal expansion that is different than the first coefficient of thermal expansion of the polymeric structure and wherein, in a first operational mode, the metallic layer contacts the exterior-facing surface and in a second operational mode, after exposure to a thermal load of greater than or equal to about 500° C., the metallic layer partially delaminates from the exterior-facing surface and forms two or more insulating air gaps defined by one or more anchored regions where the metallic layer remains in contact with the polymeric structure, the two or more insulating air gaps defining a thermal barrier.

2. The composite material housing of claim 1, wherein the fire-resistant material layer comprises aromatic polyamide fibers, a resin matrix, or a combination of the aromatic polyamide fibers and the resin matrix, where the aromatic polyamide fibers are continuously or randomly distributed within the resin matrix.

3. The composite material housing of claim 2, wherein the resin matrix is selected from the group consisting of: epoxy, phenolic resin, polyester, vinyl ester, and combinations thereof.

4. The composite material housing of claim 2, wherein the fire-resistant material layer comprises greater than or equal to about 30 vol. % to less than or equal to about 60 vol. % of the aromatic polyamide fibers and greater than or equal to about 40 vol. % to less than or equal to about 70 vol. % of the resin matrix.

5. The composite material housing of claim 1, wherein the reinforcing material layer comprises reinforcing fibers selected from the group consisting of: carbon fibers, glass fibers, basalt fibers, natural plant fibers, and combinations thereof.

6. The composite material housing of claim 5, wherein the reinforcing material layer further comprises a resin matrix, the reinforcing fibers continuously or randomly distributed within the resin matrix.

7. The composite material housing of claim 6, wherein the resin matrix is selected from the group consisting of: epoxy, phenolic resin, polyester, vinyl ester, and combinations thereof.

8. The composite material housing of claim 6, wherein the reinforcing material layer comprises greater than or equal to about 30 vol. % to less than or equal to about 60 vol. % of the reinforcing fibers and greater than or equal to about 40 vol. % to less than or equal to about 70 vol. % of the resin matrix.

9. The composite material housing of claim 1, wherein the metallic layer comprises a material selected from the group consisting of: steel, stainless steel, aluminum, alloys, and combinations thereof.

10. The composite material housing of claim 1, wherein the composite material housing further comprises:
    an adhesive layer attaching the metallic layer and the reinforcing material layer, the adhesive having a ductility value of greater than or equal to about 2% to less than or equal to about 20% at a temperature above about 200° C.

11. The composite material housing of claim 1, wherein the fire-resistant material layer has an average thickness greater than or equal to about 1 millimeter to less than or equal to about 4 millimeters, the reinforcing material layer an average thickness greater than or equal to about 1 millimeter to less than or equal to about 3 millimeters, and the metallic layer has an average thickness greater than or equal to about 0.01 millimeters to less than or equal to about 0.5 millimeters.

12. The composite material housing of claim 2, wherein the first coefficient of thermal expansion is less than or equal to $10 \times 10^{-6}$ $K^{-1}$ in a direction of the aromatic polyamide fibers and about $30 \times 10^{-6}$ $K^{-1}$ to $50 \times 10^{-6}$ $K^{-1}$ in a transverse direction.

13. The composite material housing of claim 1, wherein the reinforcing material layer are selected from the group consisting of: basalt fibers, natural plant fibers, and combinations thereof.

14. A composite material housing for a battery pack for reducing or minimizing thermal runaway propagation, the composite material housing comprising:
    a fire-resistant material layer comprising aromatic polyamide fibers continuously or randomly distributed within a first resin matrix;
    a reinforcing material layer disposed near to a surface of the fire-resistant material layer, the reinforcing material layer comprising reinforcing fibers continuously or randomly distributed within a second resin matrix, the reinforcing material layer and the fire-resistant material layer together defining a polymeric structure having a first coefficient of thermal expansion; and a metallic layer disposed near to a first surface of the reinforcing material layer away from the fire-resistant material layer, wherein the metallic layer has a second coefficient of thermal expansion that is different than the first coefficient of thermal expansion of the polymeric structure and wherein, in a first operational mode, the metallic layer contacts the first surface and, in a second operational mode, after exposure to a thermal load of greater than or equal to about 500° C., the metallic layer partially delaminates from the first surface and forms two or more insulating air gaps defined by one or more anchored regions where the metallic layer remains in contact with the polymeric structure, the two or more insulating air gaps defining a thermal barrier.

15. The composite material housing of claim 14, wherein the first and second resin matrices are independently selected from the group consisting of: epoxy, phenolic resin, polyester, vinyl ester, and combinations thereof, and the metallic layer comprises a material selected from the group consisting of: steel, stainless steel, aluminum, alloys, and combinations thereof.

16. The composite material housing of claim 14, wherein the fire-resistant material layer comprises greater than or equal to about 30 vol. % to less than or equal to about 60 vol. % of the aromatic polyamide fibers, and greater than or equal to about 40 vol. % to less than or equal to about 70 vol. % of the first resin matrix, and the reinforcing material layer comprises greater than or equal to about 30 vol. % to less than or equal to about 60 vol. % of the reinforcing fibers, and greater than or equal to about 40 vol. % to less than or equal to about 70 vol. % of the second resin matrix.

17. The composite material housing of claim 14, wherein the composite material housing further comprises:

an adhesive layer binding the metallic layer and the reinforcing material layer, the adhesive layer having a ductility value of greater than or equal to about 2% to less than or equal to about 20% at a temperature above about 200° C.

18. The composite material housing of claim 14, wherein the fire-resistant material layer has an average thickness greater than or equal to about 1 millimeter to less than or equal to about 4 millimeters, the reinforcing material layer an average thickness greater than or equal to about 1 millimeter to less than or equal to about 3 millimeters, and the metallic layer has an average thickness greater than or equal to about 0.01 millimeters to less than or equal to about 0.5 millimeters.

19. A method of forming a composite material housing for a battery for reducing or minimizing thermal runaway propagation, the method comprising:

disposing a metallic layer into a cavity of a mold;

disposing a reinforcing material into the cavity near to the metallic layer;

disposing a fire-resistant material into the cavity near to the reinforcing material;

disposing a resin or a precursor of the resin into the cavity, the resin or the precursor of the resin surrounding the reinforcing material and the fire-resistant material;

solidifying the resin or the precursor of the resin to form a composite material comprising a metallic layer, a reinforcing material layer near to the metallic layer, and a fire-resistant material layer near to the reinforcing material layer, the reinforcing material layer and the fire-resistant material layer together defining a polymeric structure having a first coefficient of thermal expansion and the metallic layer having a second coefficient of thermal expansion that is different than the first coefficient of thermal expansion of the polymeric structure; and removing the composite material from the cavity to form the composite material housing, and after exposure to a thermal load of greater than or equal to about 500° C., the metallic layer of the composite material housing delaminating from the exterior-facing surface and forms two or more insulating air gaps defined by one or more anchored regions where the metallic layer remains in contact with the polymeric structure, the two or more insulating air gaps defining a thermal barrier.

20. The method of claim 19, wherein the method further comprises at least one of: heating the mold and applying a pressure to the mold for compression.

* * * * *